United States Patent [19]

Yoshikawa

[11] 4,386,128

[45] May 31, 1983

[54] HEAT INSULATING LAMINATE

[76] Inventor: Yutaka Yoshikawa, C-409, Tsutsujigaoka Haim, 2-13-3, Shibazaki, Chofu-shi, Tokyo-to, Japan

[21] Appl. No.: 231,290

[22] Filed: Feb. 4, 1981

[30] Foreign Application Priority Data

Feb. 6, 1980 [JP] Japan ............... 55-013886

[51] Int. Cl.³ .......... B32B 3/26; B32B 3/28
[52] U.S. Cl. .................... 428/152; 428/178; 428/198; 428/209; 428/212; 428/920
[58] Field of Search ......... 428/152, 198, 209, 212, 428/920, 174, 178, 463; 156/85, 183, 290

[56] References Cited

U.S. PATENT DOCUMENTS

| 1,987,798 | 1/1935 | Ruppricht | 428/920 |
| 3,525,663 | 8/1970 | Hale | 428/178 |
| 3,574,109 | 4/1971 | Yoshikawa | 428/198 |
| 3,655,502 | 4/1972 | Yoshikawa | 428/152 |

FOREIGN PATENT DOCUMENTS 52-32074 3/1977 Japan ............... 428/198

Primary Examiner—Paul J. Thibodeau
Attorney, Agent, or Firm—Ostrolenk, Faber, Gerb & Soffen

[57] ABSTRACT

The disclosure concerns a heat insulating laminate which is comprised of a contractile thin film, a first noncontractile metal reflecting thin film at at least one side of the contractile film and at least a second noncontractile metal reflecting thin film beyond the first one of those films. Adjacent films are bonded together at scattered areas. In one version, the density of the bonding areas between the contractile film and the first noncontractile film is greater and the density of the bonding areas between successive noncontractile layers away from the contractile layer decreases stepwise. Shrinking of the contractile film causes wrinkles in the noncontractile films. An additional protective film may be laminated to the contractile film.

7 Claims, 5 Drawing Figures

HEAT INSULATING LAMINATE

BACKGROUND OF THE INVENTION (1) Field of the Invention

The present invention relates to a heat insulating laminate.

The main application of the heat insulating laminate of the present invention is as a heat insulating material, but it is not necessarily limited to this. For example, the heat insulating laminate of the present invention may be used as a soft wall material or a decorating material for a building, or as a separate storage material for fluids.

(2) Description of the Prior Art

An insulating material which utilizes the shrinkage of a contractile thin film is disclosed in U.S. Pat. Nos. 3,574,109 and 3,655,502.

This disclosure of the prior art, however, only refers to the partial bonding of a noncontractile metal thin film with a contractile thin film and does not teach continuous multi-lamination of noncontractile metal thin films. The metal thin films are stacked for improving the heat insulating effects. Although direct contact between the metal surfaces may be advantageously avoided, the number of reflective metal thin films among the total number of the films is increased. This still leaves much room for improvement with respect to performance, cost, and easy workability. When the continuous multi-lamination of the noncontractile reflecting metal thin films in which noncontractile reflecting metal thin films, for example, aluminum foils are directly stacked one upon another is adopted, these properties may be improved. However, good results are not obtainable with respect to separation between the respective films and good lamination characteristics. When thin aluminum foils are continuously laminated, adjacent foils will have congruent wrinkles as if they were one aluminum foil. They fail to provide sufficient space therebetween, that is, thickening effects, even if they are partially separated. The Japanese Laid-Open Patent Application No. 60850/75 has been proposed to provide an improved heat insulating laminate. This application, however, only discloses multilayered spot-bonded foils according to which the interior of the air bag is spot-bonded and does not concentrate on the shrinkage of the contractile films. Thus, it has been proposed that both sides be pulled to thicken the laminate.

SUMMARY OF THE INVENTION

An object of the present invention is to provide a heat insulating laminate which is thickened by bonding a contractile thin film with a noncontractile metal reflecting thin film at scattered small areas and shrinking the contractile thin film to form wrinkles in the noncontractile metal reflecting thin film, characterized in that noncontractile metal reflecting thin films are continuously laminated on a side of a contractile thin film, and the number of the metal reflecting thin films per side of the contractile thin film exceeds 1.

Another object of the present invention is to provide a heat insulating laminate, characterized in that the number of the metal reflecting thin films per side of the contractile thin film exceeds 1, and the density of the bonding areas decreases in a stepwise manner toward the film farther form the contractile thin film.

A further object of the present invention is to provide a heat insulating laminate, characterized in that the number of the metal reflecting thin films per side of the contractile thin film exceeds 1, and the bending resistance is changed in a stepwise manner between adjacent noncontractile metal reflecting thin films.

A still further object of the present invention is to provide a heat insulating laminate, characterized in that the number of the metal reflecting thin films per side of the contractile thin film exceeds 1, and the outer side of the contractile thin film opposite to the metal reflecting thin films comprises a plastic noncontractile thin film or an unshrunk contractile thin film.

BRIEF DESCRIPTION OF THE DRAWINGS

The attached drawings illustrate an embodiment of the present invention wherein

FIG. 1 shows the bonding points of the facing surfaces (1+2) of a contractile thin film 1 and a noncontractile reflecting metal thin film 2.

FIG. 2 shows the bonding points of the facing surfaces (2+3) of noncontractile reflecting metal thin films 2 and 3.

In FIGS. 1 and 2, the transverse length of the upper side denotes the transverse length of the elongate material, and the material is laminated in the vertical direction (upper side of the figure) at random positions.

FIG. 3 shows the transverse section of a laminate of the films of FIGS. 1 and 2 after thickening.

FIG. 4 shows the longitudinal section of the same.

DETAILED DESCRIPTION OF THE INVENTION

Figure 1:
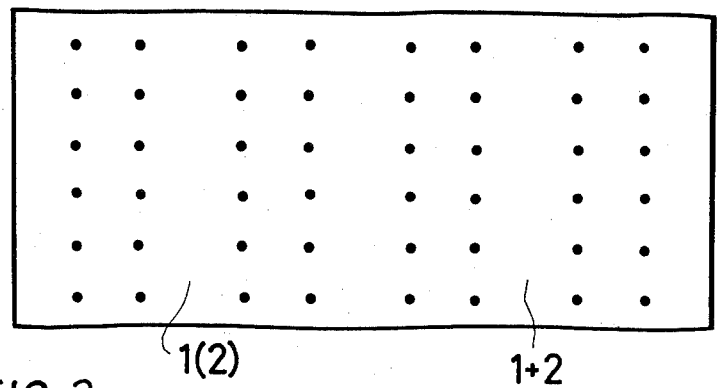
FIGS. 1 to 4 show the case wherein the density of the bonded points is in a stepwise manner decreased as disclosed in claim 2 of the specification.

Before describing the present invention, the terms used will first be explained.

A "contractile thin film" means a contractile film which can contract other members as well as itself. The contracting force is obtained at ambient temperature or at a particular temperature. The means for effecting this contraction are not limited, and the contraction may be performed by providing suitable temperature conditions, releasing at the contracting temperature the elongated condition of a material which has been mechanically held elongated, and so on. An example is an elastic rubber thin film or a plastic stretchable film. Another example is a contractile plastic film or a form-retaining metal thin film which is contracted at a working temperature. All thermo-plastics have contractile properties under stretching processing under suitable conditions. In addition to this, the contraction of a contractile thin film may be caused to occur by the separation of component solvents contained therein by vaporization or extraction.

These contractile films are not particularly limited as to their transparency, color or presence and absence of a pattern. Although metal thin films may be attached thereto, the contracting property must be retained.

A "noncontractile reflecting metal thin film" is a film which is noncontractile relative to a contractile thin film. The purpose of adopting such a thin film is to form wrinkles by the difference in the areas of the films so that these wrinkles thicken the overall laminate and form spaces therein.

As a reflecting metal thin film, all insulating metals and alloys known as having reflecting metal surfaces of low emmisive power may be adopted. One example of them is aluminum foil. The thickness of such a film is not particularly limited. Since only the surface property is important, the thinner the film, the cheaper the cost. The thin films are not limited to foils and may be general films (generally nonmetallic materials, such as plastics, paper, and cloth) to the surface of which reflecting metal films are adhered. The adhering method is not particularly limited. Various methods may be adopted such as laminating, plating, vacuum depositing, metalikon and sputtering.

As for "scattered small areas," although points are typical, lines may also be used. However, in order not to obstruct the shrinking and wrinkling, long lines in the direction of the wrinkles should not be adopted. Furthermore, since the introduction of air from both ends of the elongated material is essential, these bonding areas should not obstruct this process. From the perspective of heat insulation as well, it is better to have a shorter length of contact. The formation of wrinkles varies according to the distance between the bonding areas and their relation to the direction of shrinkage. This, of course, influences the shape and the mean thickness of the air layer. Since these areas are necessary for retaining the overall shape of the laminate after forming the wrinkles, their positions, size and density are important when continuous lamination of noncontractile reflecting metal surfaces is involved.

"Bonding" denotes all kinds of bonding such as soldering and sewing in addition to bonding with an adhesive.

The laminating on a contractile thin film is made on one surface or on both surfaces thereof. With a thermo-contractile thin film, however, the laminating on one surface is often employed owing to its being easy to heat. In contrast, with a contractile thin film such as a plastic stretched film which is not required to heat, the laminating on both surfaces is useful. Thus, according to the present invention, it is possible to select any of the two means laminating on one surface and on both surfaces depending upon the object, whatever kind of film is used. In the claims, although the number of laminated thin films is described only with reference to one side of the contractile thin film, this is done only for the sake of simplicity. When there are three noncontractile metal thin films which are interposed between two contractile thin films, it is considered that two noncontractile metal thin films are laminated on one side of either of these contractile thin films. Although 1.5 films is the result obtained by calculation, the fractions are rounded up. Therefore, it may be said that both of the contractile thin films have the second noncontractile metal thin film at their one side. More precisely, it may be said to be correct to count from the first bonded layer to the second bonded layer from the contractile thin film.

In this specification, the number of thin films varies depending on the shrinkage of the contractile thin film, the resistance of the noncontractile metal thin film, the bonding density and the like. However, it may be considered to mean less than 10, and usually 2 or 3.

When most of the thickness of the noncontractile metal thin film is shared by the plastic film, it is possible to laminate more films in the multi-laminating in which metal reflecting thin films, for example, aluminum foils are directly stacked one upon another at continuous bonding points than in the case of the metal foils. The recovery force of the elastic plastic film to form a flat surface constantly acts to thicken the thin films and to hold the thickened shape after thickening. This, together with the strain of shrinkage at the bonding points, preferably acts to maintain the thickened condition.

When plastic films and metal foils are alternately used in place of the noncontractile metal reflecting thin films, differences in bending resistance arise between the respective films when the contractile thin films are shrunk, making separation between the respective films easy. For the same reason, with the metal foils, it is easy to vary the bending resistance by selectively using hard, semi-hard, and soft aluminum foils by annealing or not annealing or by selecting the degree of annealing. It is also possible to change the bending resistance by changing the thickness of the foils or a combination of hardness and the thickness. It is further possible to change the bending resistance by utilizing the presence or absence or degree of the forces exerted from the inside or outside of the laminate, that is, the force exerted by laminating the noncontractile metal reflecting thin films. This provides practical advantages.

In the fourth aspect of the present invention, the outer side of the array of films opposite to the contractile thin film comprises a further thin film, which is a plastic noncontractile thin film or an unshrunk contractile metal thin reflecting film. This aspect of the present invention is advantageous in the favorable functions of maintaining the thickened condition of the plastic film regardless of the presence of the metal reflecting surface, acting as a protective cover against dust and corrosion, carrying of the metal reflecting surface, and acting as a laminate thin film basic carrier of the metal foil which is ultra thin and which is thus easily broken during manufacture. However, contractile thin films are generally expensive, and the formation of the metal reflecting surface on the thin film and making it function properly is harder than in the case of noncontractile plastic films. When the contractile thin film is not shrunk (for example, when a thermo-contractile plastic film is not heated), the function of maintaining the thickened condition is the same as in the case of the noncontractile plastic film. For thin reason, the difference effects are to be obtained only when the thermo-contractile plastic film is heated.

When a contractile thin film is used in place of the noncontractile thin film, with the thermo-contractile thin film, the same effects as in the case of the noncontractile plastic thin film may be obtained when it is not heated. However, it is more advantageous when the noncontractile plastic film forms the outer layer at the opposite side of the contractile thin film.

According to claim 2 of the present invention, the contracting force of the contractile thin film is mainly utilized, and the continuous multilayered laminate of the noncontractile metal reflecting thin films is wrinkled to be sufficiently thickened. This is based on the idea that when the distribution of the bonding areas of the prior art is well adjusted to vary uniformly from layer to layer, wrinkles of isosceles angles may be obtained, providing a laminate which is a preferable heat insulating material in terms of thickening property, uniformity and heat insulating effects. This technical principle of setting density variations between the layers is far advanced.

With the conventional method for obtaining varied bonding areas of uniform distribution and equal density between the front bonding surfaces and the rear bonding surface, when the manufacture and the shrinking are substantially completed, better effects may be expected than with other methods and structures. However, at present, it is impossible with the conventional device to laminate nontransparent metal reflecting thin films so that they may be directly stacked one upon another, two-dimensionally control the bonding area positions at the front and rear surface, and to laminate them with soft and elastic plastic films, with the precision required in the present invention.

Although it may not be absolutely impossible to attain such control, the research, investments, and equipment are required, resulting in higher manufacturing cost. Another problem is that the research must first be completed and large investments are required at the initial period of such studies. Although all kinds of new products gradually increase in their production numbers, since the laminating devices of the type concerned here, for example, dry laminating machines, have large capacities, waste results. If the products of the present invention may be manufactured with a device which has heretofore been impossible to operate while other conventional products are being manufactured, the effect is the opposite to that described above, resulting in no waste.

It has not yet been proposed to avoid closeness or superposition of the bonding areas at the front and rear surface while reducing the density of the bonding areas as in claim 2 of the present invention. Nor has it been proposed to continuously perform multi-lamination at high speed without positioning while realizing the separation between the layers and the thickening required.

Describing the smaller density of the bonding areas in more detail, i.e., the degree of this smaller density, the noncontractile metal reflecting thin film at the side where the density is smaller encompasses several wrinkles at the side where the density is greater. This is more apparent in the planar direction of the two-dimensional structure, that is, in the direction of the greatest shrinkage.

Although the method for reducing the density in the longitudinal and transverse directions is not particularly limited, it is more effective to reduce the density in the direction of the greatest shrinkage. However, with a device for continuously laminating an elongated material with rollers, closeness or superposition of the bonding areas in the direction of the roller axis may be effectively prevented if the positions of the bonding areas arranged at a smaller density on the plate and the positions of the bonding areas arranged at a greater density on the plate are made to occupy different regions on the roller axis, since position control in the direction of the roller axis is possible to a certain extent. Although no control is performed in the perpendicular direction, that is, the longitudinal direction of the elongated product, the bonding areas are less probable to align in the longitudinal direction due to the difference in the density.

It has been seen that the superposition and the closeness of the bonding areas may be made negligible. However, the problem is that the wrinkles suitable for heat insulation are uniformly formed. Another problem, however, is found to precede this problem. That is, the problem of good separation between the two layers. When this separation is well performed, it has been confirmed that the problem of the formation of wrinkles which are too large may be solved.

When the bonding areas are arranged at a smaller density, the smaller number of areas act as bases for forming wrinkles in the noncontractile metal reflecting thin film. Since the number of base areas is small, this layer is made to float on the underlying layer with more wrinkles and encompasses these wrinkles to form a larger wrinkle.

However, since the thin film itself is extremely thin, such a large wrinkle cannot stably be retained, so that it is divided into many smaller but stabler wrinkles.

With the thermo-contractile films, the large wrinkles are naturally turned into smaller divided wrinkles by air pressure during heating, by pressure from the surface plate at the outer or inner side when the laminate is housed in the wall space, or by the small force generated when identical laminates are stacked, so that no special measures need be taken to prevent the formation of such large wrinkles.

An example of the present invention will now be described, with the emphasis on the heat insulating performance and advantageous features.

EXAMPLE

Figure 2:
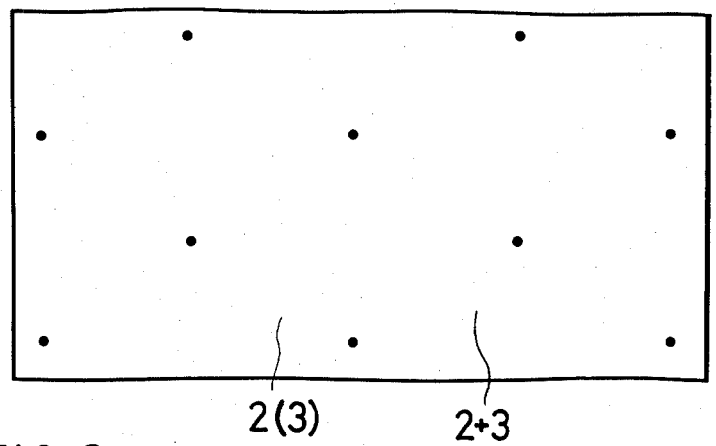
Figure 3:
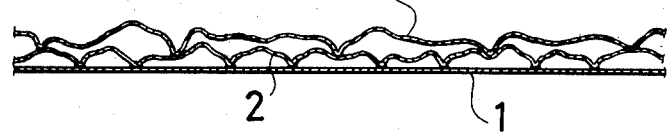
Figure 4:
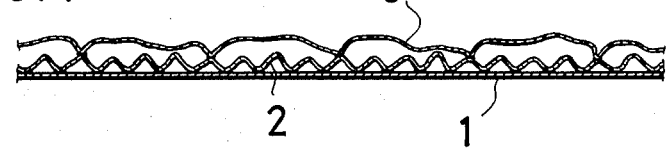
Figure 5:
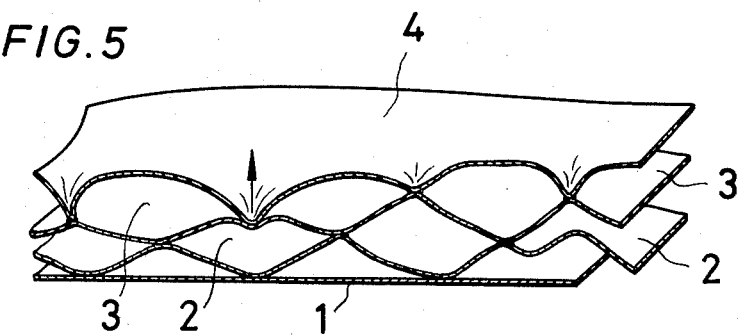
FIG. 5 is a partial, perspective sectional view illustrating, as disclosed in claims 3 and 4 of the present specification, noncontractile elastic films such as plastic films wherein the direction and position of the points of gradual recovery are indicated when the films are temporarily depressed since the wrinkles are hard to form, the formed wrinkles are rounded without pointed edges, and the internal residual stress is uniformly dispersed in the form of around recesses and projections unlike in the case of metal foils with balance over the entire surface as in the case of surface tension. In the drawings, reference numeral 1 denotes a contractile thin film; 2 and 3, aluminum foils; and 4, a noncontractile plastic film.

An aluminum foil of 7 $\mu$m thickness was bonded to one side of a biaxially stretched film of 17 $\mu$m thickness of a polyvinyl chloride in a point pattern as shown in FIG. 1. A similar aluminum foil was bonded thereover in a point pattern as shown in FIG. 2. In both FIGS. 1 and 2, the width of the material is about 95 cm. They were temporarily secured to wooden frames at several places with 10% slack in the longitudinal direction and 5% slack in the transverse direction. The film was uniformly shrunk and made smooth by warm air of about 120° C. The aluminum foil at the rear surface of the film formed wrinkles as shown by the sectional view of FIG. 3. Although the maximum thickness of the wrinkle was about 10 cm from the film, it was not constant.

The central portions of this contractile thin film and the wrinkled aluminum foil were cut out in two squares having 60 cm on a side. They were adhered with adhesive tape to a square wooden frame of 60 mm thickness such that their film sides faced outward and the four aluminum foils faced inward. Wooden frame spacers of 10 mm thickness were disposed at the upper and lower surfaces of the heat insulating mateiral of 60 mm thickness to form an air layer of 80 mm total thickness. The thermal conductivity with the horizontal arrangement was measured with a thermal current from the upper surface to the lower surface. The measuring device used was an RTM steady-state thermal conductivity measuring device manufactured by SHOWA DENKO K.K., which has a particularly high precision. This measuring device is also known as an improved device over ASTMC-177, C-236, and C-518. The RTM device uses two thermal current meters and built-in surface heaters. The improved heaters are arranged one for the top and bottom surfaces and one for four sides of the device.

Each RTM device comprises a constant output heater, a thermal current meter, and a surface temperature measuring element. The sensitivity of the thermal current meter for the top and bottom surface is an output of over 1 mV for a current of 20 Kcal/m².h, and the guard sensor for the four sides has an output of over 1 mV for a current of 100 Kcal/m².h. For providing the electromotive force for the thermoelectric pile and the thermocouple, a digital type voltmeter having a sensitivity of at least ±1 μV is used.

The thermal conductivity of the bottom surface of the 80 mm sample air layer was measured as the air layer was in direct contact with the hot plate and the thermal conductivity of the upper surface was measured as the air layer was in direct contact with the cold plate.

| | Measurements | |
|---|---|---|
| Sample Thickness (mm) | Mean Temperature at Central Surface of Thickness (°C.) | Apparent Thermal Conductivity of Air Layer of Insulating Material |
| | 46.8 | 0.0488 |
| | 49.5 | 0.0493 |
| 80 | 54.3 | 0.0545 |
| | 60.0 | 0.0522 |

It is seen from the above that the thermal conductivity was 0.05 Kcal/m.h.°C. at the mean temperature of about 50° C. at the central surface of thickness.

The density of the heat insulating material of the present invention used for the air layer of 80 mm thickness was about 1.7 Kg/m³, which corresponds about 1/20 of the value, 30 to 35 Kg/m³, of foam plastic heat insulating material.

The density of the glass fiber heat insulating material was 15 to 30 Kg/m³, which is about the same as that of the foam plastic heat insulating material. Furthermore, since this is manufactured by melting at a high temperature, the material of the present invention is advantageous in terms of energy saving.

The thermal conductivity of 0.05 Kcal/m.h.°C. is not particularly good as compared with general heat insulating materials. It is possible to improve this according to the present invention. It is well proved by known theories of radiation of reflecting plate type heat insulating materials that the thermal conductivity may be improved by increasing the number of foils above 4 foils/8 cm as in the above example.

The important thing to note about the example of the present invention is that the material of the present invention has 1/10 to 1/20 the density of the conventional material for attaining the same degree of heat insulating effects.

Another feature is that the heat insulating material may be applied in large scale with simplicity and without undesirable spaces for a thicker structure, and the material is resistant to vibrations, fire and humidity.

The wrinkles in the aluminum foils can be crushed under compression so that the heat insulating material of the present invention may not be suitable for use under pressure. However, this defect may be neglected When the heat insulating material is used in the hollow walls or containers. The heat insulating material may be used without a covering in places which are open downwardly, such as the bottom surfaces of roofs or floors. This also applies to the top surface of a roof. For preventing degradation in reflecting performance, it is most convenient if a plastic film is covered over the outermost layer so that deposited dust may not become attached to the reflecting surface.

When dust, glass fiber or the like is placed on the plastic film, the heat insulating effects may be increased. However, it is hard to arrange fibrous material such as glass fiber in the horizontal direction.

What is claimed is:

1. A heat insulating laminate, comprising:
    a contractile thin film; a first noncontractile metal reflecting thin film at at least one side of the contractile film; at least a second noncontractile metal reflecting thin film at the same one side of the contractile film and located beyond the first noncontractile metal reflecting film;
    the first noncontractile film being laminated to the contractile film by being bonded thereto at scattered small areas, and the second noncontractile film being laminated to the first noncontractile film at scattered small areas located between the first and the second noncontractile films;
    the density of the bonding areas between adjacent films decreases in a stepwise manner from the density thereof between the contractile film and the first noncontractile film to the density thereof between each succeeding pair of adjacent noncontractile films toward the film farthest from the contractile thin film.

2. A heat insulating laminate, comprising:
    a contractile thin film; a first noncontractile metal reflecting thin film at at least one side of the contractile film; at least a second noncontractile metal reflecting thin film at the same one side of the contractile film and located beyond the first noncontractile metal reflecting film;
    the first noncontractile film being laminated to the contractile film by being bonded thereto at scattered small areas, and the second noncontractile film being laminated to the first noncontractile film at scattered small areas located between the first and the second noncontractile films;
    the bending resistance of the laminate is changed in a stepwise manner between succeeding adjacent noncontractile metal reflecting thin films.

3. A heat insulating laminate according to either of claims 1 or 2, wherein the outer side of the contractile thin film opposite to the noncontractile metal reflecting thin films comprises a further plastic noncontractile thin film.

4. A heat insulating laminate according to either of claims 1 or 2, wherein the outer side of the contractile thin film opposite to the noncontractile metal reflecting thin films comprises an additional unshrunk contractile thin film.

5. A heat insulating laminate, according to any of claims 1 or 2, wherein the contractile film is in its contracted condition and the first and the second non-contractile films are accordingly wrinkled in their own respective wrinkle patterns for forming air pockets between the bonded films in the heat insulating laminate.

6. A heat insulating laminate, according to claim 3, wherein the contractile film is in its contracted condition and the first and the second non-contractile films are accordingly wrinkled in their own respective wrinkle patterns for forming air pockets between the bonded films in the heat insulating laminate.

7. A heat insulating laminate according to claim 4, wherein the contractile film is in its contracted condition and the first and the second non-contractile films are accordingly wrinkled in their own respective wrinkle patterns for forming air pockets between the bonded films in the heat insulating laminate.

* * * * *